United States Patent
Eto et al.

(10) Patent No.: US 9,727,888 B2
(45) Date of Patent: Aug. 8, 2017

(54) SALES PROMOTION ASSISTING SYSTEM

(75) Inventors: Batara Eto, Tokyo (JP); Jun Tamura, Tokyo (JP); Emi Tsubakiyama, Tokyo (JP); Masuru Kurita, Tokyo (JP); Munetoshi Tsuda, Tokyo (JP)

(73) Assignee: GURUNAVI, INC., Tokyo (JP)

( * ) Notice: Subject to any disclaimer, the term of this patent is extended or adjusted under 35 U.S.C. 154(b) by 365 days.

(21) Appl. No.: 14/233,756

(22) PCT Filed: Jul. 18, 2012

(86) PCT No.: PCT/JP2012/068165
§ 371 (c)(1),
(2), (4) Date: Feb. 7, 2014

(87) PCT Pub. No.: WO2013/011995
PCT Pub. Date: Jan. 24, 2013

(65) Prior Publication Data
US 2014/0156377 A1    Jun. 5, 2014

(30) Foreign Application Priority Data

Jul. 20, 2011   (JP) .................................. 2011-158954

(51) Int. Cl.
*G06Q 30/02* (2012.01)

(52) U.S. Cl.
CPC ..... *G06Q 30/0238* (2013.01); *G06Q 30/0207* (2013.01)

(58) Field of Classification Search
CPC combination set(s) only.
See application file for complete search history.

(56) References Cited

U.S. PATENT DOCUMENTS

| | | | |
|---|---|---|---|
| 7,676,393 B2* | 3/2010 | Postrel | G06Q 20/06 705/14.3 |
| 2008/0010151 A1* | 1/2008 | Bridges | G06Q 30/02 705/14.34 |
| 2011/0028160 A1* | 2/2011 | Roeding | G06Q 30/00 455/456.1 |

(Continued)

FOREIGN PATENT DOCUMENTS

| | | |
|---|---|---|
| CN | 1675644 A | 9/2005 |
| CN | 101303780 A | 11/2008 |

(Continued)

OTHER PUBLICATIONS

Collision, James Robert.(2011). Wherever You Go, There We Are Tourism in a Society of Ugiquitous Connectivity. Dissertation submitted to Michigan State Univertiy. p. 1-180.*

(Continued)

*Primary Examiner* — Fonya Long
*Assistant Examiner* — Marie Brady
(74) *Attorney, Agent, or Firm* — Oliff PLC

(57) ABSTRACT

Sales promotion assisting systems are disclosed. Such systems include a sales promotion assisting system in which specific incentive is retrieved by passing a portable terminal or the like over a predetermined terminal installed in a store such as an eating and drinking establishment. An incentive can be exchanged for an item or the like of application software such as a game, which can lead to sales promotion.

5 Claims, 11 Drawing Sheets

(56) References Cited

U.S. PATENT DOCUMENTS

| | | | | |
|---|---|---|---|---|
| 2011/0153403 A1* | 6/2011 | Postrel | ............ | G06Q 30/02 |
| | | | | 705/14.29 |
| 2011/0195663 A1* | 8/2011 | Sakai | ............ | G06Q 10/00 |
| | | | | 455/41.2 |
| 2013/0304559 A1* | 11/2013 | Stone | ............ | G06Q 20/06 |
| | | | | 705/14.33 |

FOREIGN PATENT DOCUMENTS

| | | |
|---|---|---|
| JP | 2004-103020 A | 4/2004 |
| JP | 2007-072880 A | 3/2007 |
| JP | 2008-282291 A | 11/2008 |

OTHER PUBLICATIONS

Masakazu Tatara, Kongetsu no Mobile Felica 'Mobile FeliCa' 'Osaifu Keitai' Kanren no News, Gijutsu Kanren Joho Nado o Matomete Shokai!, Monthly mobile Felica, CardWave, vol. 22, No. 6, Jun. 20, 2009 (Jun. 20, 2009), pp. 34 to 36.

Yoichi Hiraga, iPhone demo Touch de Coupon : Jisedai 'Gurunabi Touch' ga Jitsugen suru "Otokuisan" no Tameno Coupon, [online], ITmedia, Apr. 20, 2011 (Apr. 20, 2011), Internet <URL: http://www.itmedia.co.jp/promobile/articles/1104/20/newsll5.html>.

Japan McDonald's Corporation, "Campaign Information | Coupons | McDonald's Japan," [online], internet <URL:http://www.mcdonalds.co.jp/fanclub/mcd/kazasu_coupon/index.html#happyset>.

Mar. 29, 2016 Office Action issued in Chinese Patent Application No. 201280035951.1.

* cited by examiner

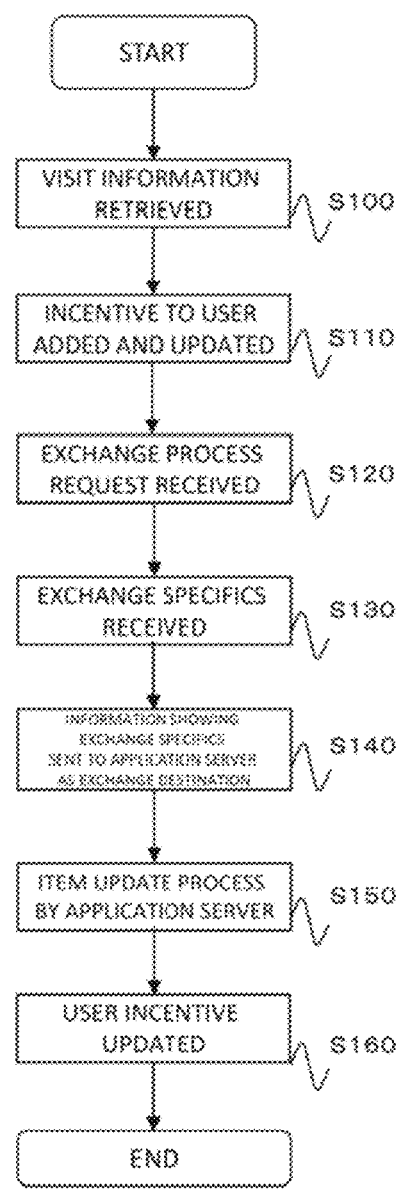

FIG. 4

| USER IDENTIFYING INFORMATION | READER IDENTIFYING INFORMATION | VISIT DATE AND TIME INFORMATION | INCENTIVE INFORMATION |
|---|---|---|---|
| 11111 | aaaaa | 2011 JULY 1  18:30 | 4 |
|  | ... | ... |  |
|  | bbbbb | 2011 JUNE 10  19:18 |  |
|  | ccccc | 2011 APRIL 12  21:25 |  |
|  | ddddd | 2011 MAY 17  18:53 |  |
|  | eeeee | 2011 JANUARY 17  20:20 |  |
|  | fffff | 2010 DECEMBER 10  13:40 |  |
|  | ggggg | 2009 MARCH 15  10:08 |  |
|  | ... | ... |  |

FIG. 5

| USER IDENTIFYING INFORMATION | READER IDENTIFYING INFORMATION | VISIT DATE AND TIME INFORMATION | INCENTIVE INFORMATION |
|---|---|---|---|
| 11111 | aaaaa | 2011 JULY 2  19:30 | 10 |
|  | ... | ... | ... |
|  | bbbbb | 2011 JUNE 10  19:18 | 2 |
|  | ccccc | 2011 APRIL 12  21:25 | 1 |
|  | ddddd | 2011 MAY 17  18:53 | 3 |
|  | eeeee | 2011 JANUARY 17  20:20 | 2 |
|  | fffff | 2010 DECEMBER 10  13:40 | 1 |
|  | ggggg | 2009 MARCH 15  10:08 | 0 |
|  | ... | ... | ... |

FIG. 6

| PROVIDING COMPANY | APPLICATION SERVICE | ITEM | INCENTIVES NEEDED |
|---|---|---|---|
| COMPANY A | GAME X | ITEM A | 3 |
| | | ITEM B | 5 |
| | | ... | ... |
| | | ITEM Z | 20 |
| | GAME Y | ITEM 1 | 1 |
| | | ITEM 2 | 3 |
| | | ... | ... |
| | | ITEM 10 | 15 |
| COMPANY B | APPLICATION Z | ITEM α | 1 |
| | | ITEM β | 2 |
| | | ITEM γ | 3 |
| | | ITEM δ | 4 |

FIG. 7

| USER IDENTIFYING INFORMATION IN APPLICATION SERVICE | USER IDENTIFYING INFORMATION IN EATING AND DRINKING ESTABLISHMENT INFORMATION PROVIDING SERVICE | USABLE ITEMS |
|---|---|---|
| AAAAA | 11111 | ITEM A, ITEM D, ITEM E |
| BBBBB | 22222 | ITEM A, ITEM B, ITEM D, ITEM E |
| CCCCC | 33333 | ITEM B, ITEM E, ITEM F, ITEM G |
| ... | ... | ... |

FIG. 8

| USER IDENTIFYING INFORMATION | READER IDENTIFYING INFORMATION | VISIT DATE AND TIME INFORMATION | INCENTIVE INFORMATION |
|---|---|---|---|
| fffff | aaaaa | 2011 JULY 2  19:30 | 5 |
| | ... | ... | |
| | bbbbb | 2011 JUNE 10  19:18 | |
| | ccccc | 2011 APRIL 12  21:25 | |
| | ddddd | 2011 MAY 17  18:53 | |
| | eeeee | 2011 JANUARY 17  20:20 | |
| | fffff | 2010 DECEMBER 10  13:40 | |
| | ggggg | 2009 MARCH 15  10:08 | |
| | ... | ... | |

FIG. 9

CURRENT TOUCH MEDAL
5 MEDALS

MARCH 4    20:50
STORE A    2 MEDALS

MARCH 5    12:50
STORE A    2 MEDALS

MARCH 6    13:50
STORE B    1 MEDAL

EXCHANGE NOW

| USER IDENTIFYING INFORMATION | READER IDENTIFYING INFORMATION | VISIT DATE AND TIME INFORMATION | INCENTIVE INFORMATION |
|---|---|---|---|
| fffff | aaaaa | 2011 JULY 2  19:30 | |
| | ... | ... | |
| | bbbbb | 2011 JUNE 10  19:18 | |
| | ccccc | 2011 APRIL 12  21:25 | |
| | ddddd | 2011 MAY 17  18:53 | |
| | eeeee | 2011 JANUARY 17  20:20 | ○ |
| | fffff | 2010 DECEMBER 10  13:40 | |
| | ggggg | 2009 MARCH 15  10:08 | |
| | ... | ... | |

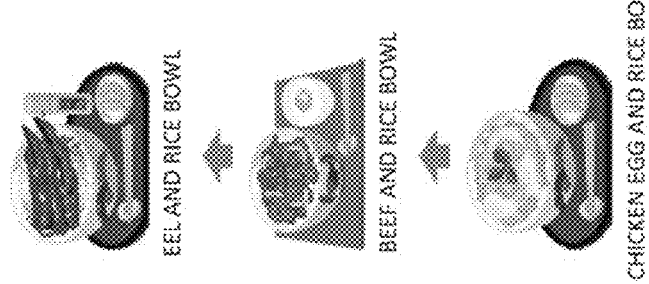
FIG. 17
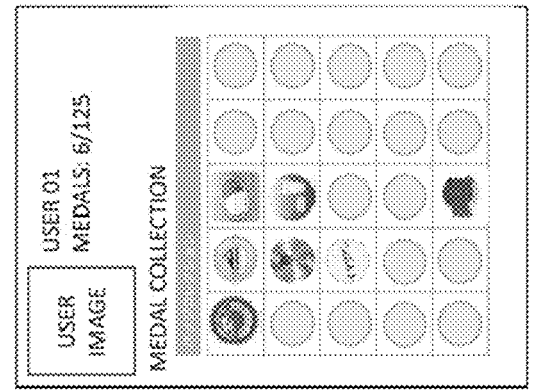
FIG. 15
FIG. 16 phrase# SALES PROMOTION ASSISTING SYSTEM

FIELD OF THE INVENTION

The field relates to sales promotion assisting systems, including systems used in eating and drinking establishments.

BACKGROUND OF THE INVENTION

In a store such as an eating and drinking establishment, various services are provided in order to bring customers in. Examples include publishing coupons and the like. However, when services such as coupons are used, there is a large effect on sales, and there is a possibility of the coupons being misused.

In view of this, there are systems such as the one shown in Non-patent Document 1, for example, in which a customer visits a store such as an eating and drinking establishment and accumulates electronic stamps by passing a portable terminal over a predetermined reading terminal, and upon accumulating a predetermined number of stamps, the customer can exchange them for a coupon.

Non-patent Document 1 refers to Japan McDonald's Corporation, "Campaign Information|Coupons|McDonald's Japan," [online], internet <URL:http://www.mcdonalds.co.jp/fanclub/mcd/kazasu_coupon/index.html#happyset>.

It would be desirable to develop systems that include avoidance of misuse of coupons.

SUMMARY OF THE INVENTION

In one example, a system for assisting sales promotions in an eating and drinking establishment, comprises a reader installed in the eating and drinking establishment, a first server for executing a process pertaining to an incentive, and a second server for exchanging the incentive for an item in an application service.

In one example, the first server includes (1) an incentive information storage part for storing visit information and incentive information; (2) a visit information retrieving part that, due to a user terminal used by a user being brought in contact with or in close proximity to a reader installed in the eating and drinking establishment, retrieves visit information including at least user identifying information and reader identifying information from a user terminal or a reader, stores the visit information in the visit information storage part (*1), and updates the user incentive information; and (3) an incentive exchange process part for updating the incentive information in the incentive information storage part when information for exchanging the incentive for an item is received from the user terminal and sent to the second server and a notification of exchange process completion is received from the second server; and In one example, the second server includes (1) an incentive exchange information retrieving part for retrieving from the first server information pertaining to the item exchanged from the incentive; (2) an item information storage part for storing item information in the application service for individual users; and (3) an item exchange process part that, on the basis of information retrieved in the incentive exchange information retrieving part, adds the item exchanged from the incentive to the user information storage part (*1) and updates the item, and sends a notification of the exchange process to the first server after the item exchange process has ended.

In another example, a system for assisting sales promotions in an eating and drinking establishment includes (a) an incentive information storage part for storing visit information received from a reader installed in an eating and drinking establishment, and incentive information; (b) a visit information retrieving part that, due to a user terminal used by a user being brought in contact with or in close proximity to a reader installed in the eating and drinking establishment, retrieves visit information including at least user identifying information and reader identifying information from a user terminal or a reader and stores the information in the visit information storage part (*1), and updates the incentive information of the user; and (c) an incentive exchange process part for receiving from the user terminal information for exchanging the incentive for an item, executing a process of exchanging the incentive and the item by sending the information to a second server for executing an application service that uses the item, and updating the incentive information in the incentive information storage part upon receiving a notification of exchange process completion from the second server.

In another example, a system for assisting sales promotions in an eating and drinking establishment comprises a reader installed in the eating and drinking establishment and a server for executing a process pertaining to an incentive. The server includes (a) an incentive information storage part for storing information of the incentive for individual eating and drinking establishments and visit information; (b) first means that, due to a user terminal used by a user being brought in contact with or in close proximity to a reader installed in the eating and drinking establishment, retrieves visit information including at least user identifying information and reader identifying information from a user terminal or a reader, stores the information in the visit information storage part (*1), and updates user incentive information; (c) second means for extracting the incentive information stored in the incentive information storage part and displaying image information of the items for each of the eating and drinking establishments on the user terminal in accordance with a request from application software in the user terminal; and (d) third means for displaying the eating and drinking establishment visited by the user on the user terminal on the basis of the visit information stored in the incentive information storage part, in accordance with a request from application software in the user terminal; the image information of the items for each of the eating and drinking establishments being varied according to the incentive information of the eating and drinking establishment in the incentive information storage part.

One object is to provide a sales promotion assisting system in which a specific incentive is retrieved by passing a portable terminal or the like over a predetermined terminal installed in a store such as an eating and drinking establishment, based on which the incentive can be exchanged for an item or the like of application software such as a game, which can lead to sales promotion

BRIEF DESCRIPTION OF THE DRAWINGS

Further features and advantages of the invention will become apparent from reading the following detailed description in conjunction with the following drawings, in which like reference numbers refer to like parts:

FIG. 3 is a flowchart schematically depicting an example of the process flow of the present invention;

FIG. 4 is a diagram schematically depicting an example of the incentive information storage part;

FIG. 5 is a diagram schematically depicting another example of the incentive information storage part;

FIG. 6 is a diagram schematically depicting an example of the incentive exchange information storage part;

FIG. 7 is a diagram schematically depicting an example of the item information storage part;

FIG. 8 is a diagram schematically depicting an example of the incentive information storage part;

FIG. 9 is an example of an image displaying user incentive information;

FIG. 15 is a diagram showing an example of an image of eating and drinking establishment search results;

FIG. 16 is a diagram showing an example of a brief screen of images of medals;

FIG. 17 shows a progressive change in images of medals;

DETAILED DESCRIPTION

Figure 1:
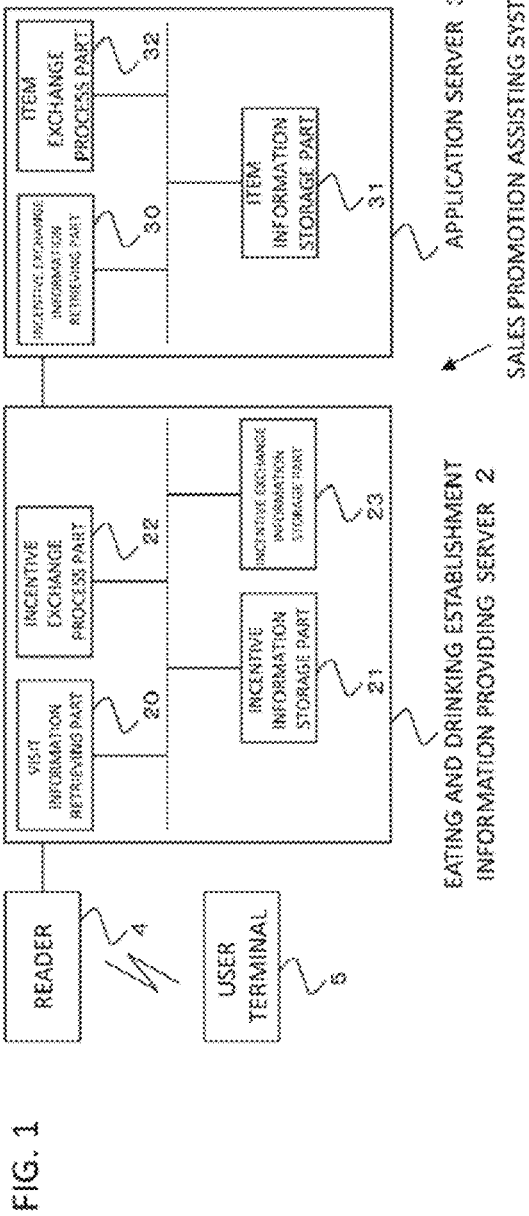
FIG. 1 is a diagram schematically depicting an overall conceptual view of the present invention.

The examples and drawings provided in the detailed description are merely examples, and should not be used to limit the scope of the claims in any claim construction or interpretation.

Problems to be Solved by the Invention

With a system such as the one disclosed in Non-patent Document 1, conventional paper stamps have merely been made electronic. Therefore, the possibility of the coupons being misused is low, but there is a possibility that use of the services of the coupons will affect sales.

Because the coupons that can be retrieved are also coupons that can be used in the store, the coupons might not necessarily attract the attention of users who would use them. Furthermore, stamps are exchanged for coupons and the users could understand their cost to some extent.

Means Used to Solve the Above-Mentioned Problems

In view of the problems described above, the inventors have invented a sales promotion assisting system in which a specific incentive is retrieved by passing a portable terminal or the like over a predetermined terminal installed in a store such as an eating and drinking establishment, based on which the incentive can be exchanged for an item or the like of application software such as a game, which can lead to sales promotion.

A first aspect is a system for assisting sales promotions in an eating and drinking establishment, comprising a reader installed in the eating and drinking establishment, a first server for executing a process pertaining to an incentive, and a second server for exchanging the incentive for an item in an application service; the first server having: an incentive information storage part for storing visit information and incentive information; a visit information retrieving part that, due to a user terminal used by a user being brought in contact with or in close proximity to a reader installed in the eating and drinking establishment, retrieves visit information including at least user identifying information and reader identifying information from a user terminal or a reader, stores the visit information in the visit information storage part (*1), and updates the user incentive information; and an incentive exchange process part for updating the incentive information in the incentive information storage part when information for exchanging the incentive for an item is received from the user terminal and sent to the second server and a notification of exchange process completion is received from the second server; and the second server having: an incentive exchange information retrieving part for retrieving from the first server information pertaining to the item exchanged from the incentive; an item information storage part for storing item information in the application service for individual users; and an item exchange process part that, on the basis of information retrieved in the incentive exchange information retrieving part, adds the item exchanged from the incentive to the user information storage part (*1) and updates the item, and sends a notification of the exchange process to the first server after the item exchange process has ended.

With a configuration such as one example of the present invention, a user can accumulate incentives by passing the user terminal (bringing the user terminal in contact with or in close proximity to) the reader installed in the eating and drinking establishment. The incentives can then be exchanged for an item of another application service. As a result, users are enticed to come to the establishment, the incentives have a wider range of use, and it is more convenient for the users.

The aspect described above can be configured in the manner of a sales promotion assisting system in which, based on the visit information, the visit information retrieving part updates the user incentive information with the incentive corresponding to the eating and drinking establishment where the reader is installed.

The aspect described above can be configured in the manner of a sales promotion assisting system in which, based on the visit information, the visit information retrieving part updates the user incentive information in accordance with the number of times the user has visited the eating and drinking establishment where the reader is installed.

The incentives accumulated by the user when visiting the establishment may include the same changes as in these aspects.

The aspects described above can achieve the same technical effects by being configured in the same manner as the present invention. Specifically, the above aspects can be configured in the manner of a system for assisting sales promotions in a eating and drinking establishment, comprising an incentive information storage part for storing visit information received from a reader installed in an eating and drinking establishment, and incentive information; a visit information retrieving part that, due to a user terminal used by a user being brought in contact with or in close proximity to a reader installed in the eating and drinking establishment, retrieves visit information including at least user identifying information and reader identifying information from a user terminal or a reader and stores the information in the visit information storage part (*1), and updates the incentive information of the user; and an incentive exchange process part for receiving from the user terminal information for exchanging the incentive for an item, executing a process of exchanging the incentive and the item by sending the information to a second server for executing an application service that uses the item, and updating the incentive information in the incentive information storage part upon receiving a notification of exchange process completion from the second server.

As another aspect, the following configuration is also allowable. The aspect can be configured in the manner of a system for assisting sales promotions in a eating and drinking establishment, comprising a reader installed in the eating and drinking establishment and a server for executing a process pertaining to an incentive; the server having: an incentive information storage part for storing information of the incentive for individual eating and drinking establishments and visit information; first means that, due to a user terminal used by a user being brought in contact with or in close proximity to a reader installed in the eating and drinking establishment, retrieves visit information including at least user identifying information and reader identifying information from a user terminal or a reader, stores the information in the visit information storage part (*1), and updates user incentive information; second means for extracting the incentive information stored in the incentive information storage part and displaying image information of the items for each of the eating and drinking establishments on the user terminal in accordance with a request from application software in the user terminal; and third means for displaying the eating and drinking establishment visited by the user on the user terminal on the basis of the visit information stored in the incentive information storage part, in accordance with a request from application software in the user terminal; the image information of the items for each of the eating and drinking establishment being varied according to the incentive information of the eating and drinking establishment in the incentive information storage part.

The user is not limited to having to use the application service for exchangeable items. The items themselves can be collected more easily by enabling item information to be displayed as image information on the basis of the incentive information, and varying the image information of the item in accordance with the incentive information, as in the present invention. As a result, users can be enticed to visit the establishment.

Effect of the Invention

According to one example of the present invention, a specific incentive can be retrieved by passing a portable terminal or the like over a predetermined reading terminal installed in a store such as an eating and drinking establishment, based on which the incentive can be exchanged for an item or the like for application software such as a game. As a result, the incentive can be exchanged for an item or the like other than a coupon, which has less of an effect on the sales of the store. The incentive can also be exchanged for an item other than those of the store, which has more usable value for the user.

BEST MODE FOR CARRYING OUT THE INVENTION

An overall conceptual diagram of an example of the present invention is schematically depicted in FIG. 1. The sales promotion assisting system 1 uses a eating and drinking establishment information providing server 2 used by an eating and drinking establishment information providing company, an application server 3 used by the eating and drinking establishment information providing company or a predetermined application service providing company, reading terminals 4 installed in different eating and drinking establishments, and user terminals 5 used by the users.

Figure 2:
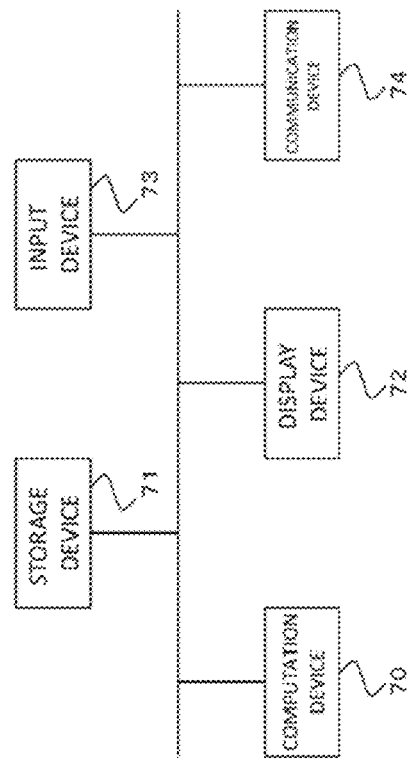
FIG. 2 is a diagram schematically depicting an example of the hardware configuration of the present invention.

The eating and drinking establishment information providing server 2 and the application server 3 have a computation device 70 such as a CPU for running computation processes of programs, a storage device 71 such as a RAM or hard disk for storing information, a display device 72 such as a display (screen), an input device 73 such as a keyboard or pointing mouse (mouse, numeric keypad, etc.), and a communication device 74 for sending and receiving the process results of the computation device 70 and the information stored in the storage device 71 via a network such as the internet or a LAN. As for the functions (means) implemented on a computer, the processes thereof are run by the means (programs, modules, etc.) for running the programs being read by the computation device 70. As for the functions, the corresponding information is read from the storage device 71 when the information stored in the storage device 71 is used in the processes thereof, and the read information is used in the processes of the computation device 70 as appropriate. FIG. 2 schematically depicts an example of the hardware configuration of these servers. The server processes may have their functions dispersed among a plurality of servers or the like.

The means of the present invention may have their functions distinguished only logically, and the functions may occupy the same physical or practical area.

The user terminal 5 is a computer terminal or a portable communication terminal used by a user, and is a terminal that is brought in contact with or close proximity to a reader 4. The portable communication terminal is a terminal which comprises a communication function such as a portable telephone (which could be a smartphone) or a PHS. The storage device 71 of the portable communication terminal preferably stores identifying information (user identifying information) for identifying the user. Furthermore, predetermined application software is stored on the portable communication terminal. With this application software, an incentive in the user's possession can be displayed, or a process for exchanging the incentive for an item can be executed.

The reader 4 is a terminal installed in one of the eating and drinking establishments, and by bringing the reader in contact with or in close proximity to the portable communication terminal, visit information indicating that a user using the user terminal 5 has arrived at the eating and drinking establishment is sent to the eating and drinking establishment information providing server 2. The reader 4 stores information capable of identifying the store or the reader 4 (referred to below collectively as "reader identifying information"). There are a variety of different communication systems for conducting communication through contact or non-contact between the reader 4 and the portable communication terminal, but RFID such as near field communication (NFC) is one example. The communication system is not limited to these examples, however. The reader 4 can be easily a device capable of communicating with a network such as the internet, or a device that cannot communicate with a network.

In the case of a reader 4 that can communicate with a network, the user identifying information stored in the user terminal 5 is read, and the read user identifying information, the reader identifying information, and visit date and time information are sent to the eating and drinking establishment information providing server 2. A reader 4 capable of communicating with a network could also be a reader 4 housing a communication function within itself, or a device connected with the reader 4 and capable of communicating with a network (e.g. a POS register, a computer terminal, or the like).

In the case of a reader 4 that cannot communicate with a network, the reader identifying information stored in the reader 4 is sent to the user terminal 5, and the user identifying information, the reader identifying information, and the visit date and time information are sent from the user terminal 5 to the eating and drinking establishment information providing server 2.

There are also cases in which the user terminal 5 is not provided with a communication function for conducting communication with the reader 4. In this case, a predetermined sound (a sound unique to each reader 4 or eating and drinking establishment) is played from the reader 4. When predetermined application software (application software for performing a process described hereinafter) has been started up in the user terminal 5 and the user terminal 5 is brought in close proximity, the reader 4 or the eating and drinking establishment is specified by the recognition of this sound in the application software, and the corresponding reader identifying information is specified. The reader identifying information recognized by the application software of the user terminal 5, the user identifying information, and the visit date and time information are then sent to the eating and drinking establishment information providing server 2.

Performing the process as described above causes information indicating a customer's visit (visit information) to be sent from the reader 4 or the user terminal 5 to the eating and drinking establishment information providing server 2.

The eating and drinking establishment information providing server 2 has a visit information retrieving part 20, an incentive information storage part 21, an incentive exchange process part 22, and an incentive exchange information storage part 23.

The visit information retrieving part 20 acquires visit information (user identifying information, reader identifying information, visit date and time information, etc.) from the reader 4 or the user terminal 5, and stores the information in the incentive information storage part 21 described hereinafter.

For each user, the incentive information storage part 21 stores when the user has visited what eating and drinking establishment, and stores reader identifying information, visit date and time information, and information pertaining to the incentive, in correlation with the user identifying information. FIG. 4 schematically depicts an example of the incentive information storage part 21. FIG. 4 shows a case of visit information for a user with the user identifying information "11111," but the visit information of other users is stored in the same manner. Incentive information is an incentive given to the user for a number of times the user terminal 5 is brought in contact with or in close proximity to the reader 4 installed in the eating and drinking establishment, and can be information of an electronic medal or the like, for example. The items that can be exchanged with the application surface provided by the application server 3 are increased by accumulating these incentives. The incentive is not limited to a medal, and various other types of information can also be used. The incentive may simply be information on the number of times.

In the case of the incentive information storage part 21 shown in FIG. 4, medals common among all the eating and drinking establishments are accumulated. In this case, the number of medals that can be accumulated may differ depending on factors such as the eating and drinking establishment or the business category of the eating and drinking establishment (a family restaurant, a beef and rice bowl shop, fast food, or the like), and the number of medals that can be accumulated may differ depending on the number of visits even within the same eating and drinking establishment (more medals can be accumulated at eating and drinking establishments that have been visited more times). In this case, whether or not it is the same eating and drinking establishment can be determined based on factors such as the reader identifying information in the visit information.

Medals may also be accumulated for each eating and drinking establishment as shown in FIG. 5. Because the incentive information storage part 21 stores visit date and time information, this part may store information on when and how many medals have been accumulated.

The incentive exchange process part 22 receives a predetermined operation from the user terminal 5, and based on the incentive stored in the incentive information storage part 21, the incentive exchange process part thereby runs a process of making an exchange for an item in the application service provided by the application server 3 corresponding to this incentive.

Specifically, information on the item exchanged for the incentive in the user terminal 5 is selected, and when this information is received from the user terminal 5, identifying information on the exchanged item, the item number, date and time information on when the exchange process was performed, and the like are sent to the application server 3. The receipt of these pieces of information by the application server 3 causes an exchange process to be performed in the application server 3. Upon receipt of a notification that the exchange process is complete in the application server 3, information on the user's incentive in the incentive information storage part 21 is updated (the incentive used in the exchange is subtracted and the information is updated) based on this received information.

When a process of automatically logging into the application server 3 is performed, authenticating information necessary for the user to log in, e.g., the user identifying information in the application service, and a password or the like are also sent.

Within the application service, the incentive exchange information storage part 23 correlates and stores the incentive information needed to exchange for items. FIG. 6 schematically depicts an example of the incentive exchange information storage part 23. In FIG. 6, the incentives are correlated to the items, but the items may also be correlated to the incentives, as shall be apparent.

The application server 3, which is a server for providing an application service (a service using the application software) to users, has an incentive exchange information retrieving part 30, an item exchange process part 32, and an item information storage part 31.

The incentive exchange information retrieving part 30 receives the identifying information on the exchanged item selected by the user, the item number, and the date and time information on when the exchange process was performed, which were sent from the eating and drinking establishment information providing server 2. When a process of automatically logging into the application server 3 is performed, a login authentication process is automatically performed with the user identifying information and password in the application service, which had been sent together. When the authentication process is performed manually, identifying information and the like on the exchanged item are temporarily stored, an image for inputting the authentication information is displayed on the user terminal 5 for the user, the inputted authentication information is received, and after the authentication process is complete in the normal manner, the temporarily stored identifying information on the exchanged item, the item number, the date and time information of when the exchange process was performed, and the like are retrieved.

The item information storage part 31 stores information on items that can be used by the users in the application service provided by the application server 3. FIG. 7 schematically depicts an example of the item information storage part 31.

The item exchange process part 32 performs the item exchange process on the basis of the information retrieved by the incentive exchange information retrieving part 30. Specifically, the user in the application service is specified based on the user identifying information (the user identifying information of either the eating and drinking establishment information providing service or the application service). For this user, the items corresponding to the identifying information of the retrieved item are added in proportion to the number of retrievals, and the item information storage part 31 is updated.

Next, an example of a process of the present invention is described using the flowchart of FIG. 3. A case of an "electronic medal" is described as an incentive in the following description. This is a case in which one electronic medal is added each time the user brings the user terminal 5 in contact with or in close proximity to the reader 4 (i.e. the user arrives at the establishment). The following is merely one example of an execution of the process of the sales promotion assisting system 1 of the present invention, and the flow of another process can also be used. The process can be replaced with another as appropriate when there is no problem with the functions before and after doing so.

When a user enters the eating and drinking establishment or when the user checks out, the user brings the user terminal 5 in contact with or in close proximity to the reader 4 installed in the eating and drinking establishment with a predetermined timing. Visit information is thereby sent from the user terminal 5 or the reader 4 to the eating and drinking establishment information providing server 2, and the information is retrieved by the visit information retrieving part 20 of the eating and drinking establishment information providing server 2 (S100).

When the user terminal 5 is brought in contact or in close proximity, various different methods can be employed depending on the form of the user terminal 5, the user terminal 5 may be brought in contact or in close proximity after the predetermined application software stored in the user terminal has been started up, or the user terminal may be brought in contact or in close proximity without starting up the software. This can be altered as needed according to the specifications of the user terminal 5 and the reader 4.

The visit information retrieving part 20 acquires the visit information from the user terminal 5 or the reader 4, and thereby causes the incentive information storage part 21 to store the visit information in the incentive information storage part 21 on the basis of the user identifying information within the visit information. The number of medals is updated by a predetermined number, which is by adding "1" in this case (S110). For example, in a case in which the visit information retrieved has "11111" as the user identifying information, "aaaaa" as the reader identifying information, and "2011 Jul. 2, 19:30" as the visit date and time information, the incentive information storage part 21 shown in FIG. 4 is updated to the incentive information storage part 21 shown in FIG. 8. Thus, the user can accumulate medals for each eating and drinking establishment by visiting the eating and drinking establishments.

As described above, every time a user visits an eating and drinking establishment, the user accumulates a medal. The medals accumulated by the user can be displayed by starting up the application software stored in the user terminal 5 and extracting the user medal information stored in the incentive information storage part 21 through access to the eating and drinking establishment information providing server 2 by the application software. FIG. 9 schematically depicts an example of this image. FIG. 9 is a diagram of a case of medals common among multiple eating and drinking establishments.

Specifically, the incentive information storage part 21 is referenced based on the user identifying information "11111," and a medal number "5" corresponding to this user identifying information is extracted and displayed. Medal accumulation history information can be displayed by retrieving the accumulated number of each different type of medal correlated with the visit date and time information (not shown).

When exchanging accumulated medals "5" for an item, the user selects a predetermined operation in the application software, e.g. "exchange now" in the image of FIG. 9, and a request for an exchange process is sent from the user terminal 5 to the eating and drinking establishment information providing server 2. When this exchange process request is received by the incentive exchange process part 22 (S120), the number of medals stored in the incentive information storage part 21 is extracted based on the user identifying information of the user, and information on exchangeable items stored in the incentive exchange information storage part 23 is extracted. An image for making this selection, such as the image shown in FIG. 10, is displayed on the user terminal 5.

Because the medal number of the user identifying information "11111" is "5," items that can be exchanged with a medal number of "5" are extracted from among the items stored in the incentive exchange information storage part 23, and these items are extracted and displayed with each application service.

Figures 10, 11:
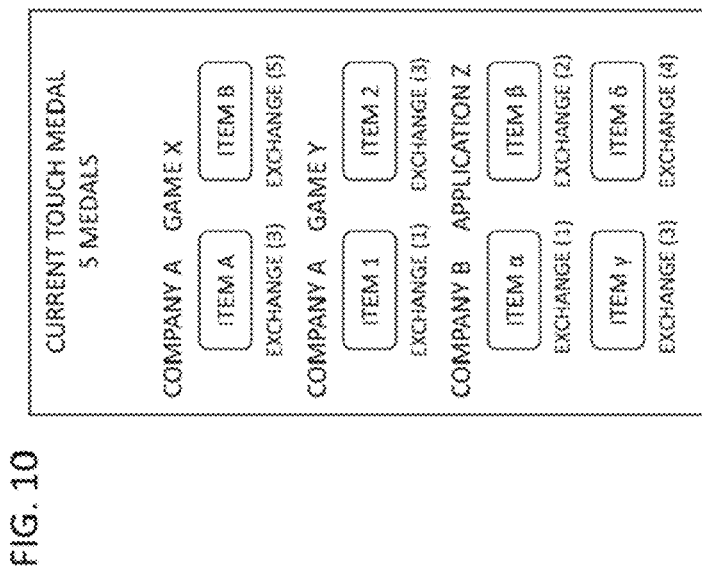
FIG. 10 is an example of an image displaying item exchange information.
FIG. 11 is a diagram schematically depicting an example of the item information storage part.

The user selects the item he or she would like to exchange from the image of FIG. 10. The identifying information and number of the item to be exchanged by the user are thereby sent from the user terminal 5 to the eating and drinking establishment information providing server 2, and are received by the incentive exchange process part 22 (S130).

When the user selects "Company A, Game X, Item B," for example, the identifying information of item B, the exchange number "1," and the user identifying information "11111" are received.

The eating and drinking establishment information providing server 2 sends the identifying information and number information of the item exchanged by the user to the application server 3 which provides the application service of the exchanged item (S140). When the user identifying information and password information of the user in the application server 3 are stored in the eating and drinking establishment information providing server 2, an authentication process can be executed automatically by sending all the information together. When the authentication process is performed manually, the application server 3 displays an authentication information input image on the user terminal 5, and after the authentication process is performed in the normal manner, the item identifying information, the item number, the date and time information of when the exchange process was performed, and the like are retrieved by the incentive exchange information retrieving part 30. Because the authentication process is being performed, the user has already been specified.

Specifically, at least identifying information of the item B and information that the exchange number is "1" are sent from the eating and drinking establishment information providing server 2 to the application server 3.

Figures 12, 13:
FIG. 12 is an example of an image showing that an item has been added.
FIG. 13 is a diagram schematically depicting an example of the incentive information storage part.

After the authentication process, the incentive exchange information retrieving part 30 of the application server 3 acquires the identifying information of the item B exchanged by the user and the number "1," which had been sent from the eating and drinking establishment information providing server 2. The item exchange process part 32 updates the user's item information stored in the item information storage part 31 of the user on the basis of the retrieved item B identifying information and the number "1" information (S150). Specifically, the item corresponding to the retrieved item identifying information is added as specified by the number, and an update is made. When the item information storage part 31 is the one in FIG. 6, the user's item is updated as shown in FIG. 11. When an item is added, an image such as the one shown in FIG. 12 is displayed by the user terminal 5, allowing the user to recognize that the item has been added.

When the item updating process is completed in the normal manner in the application server 3, the item exchange process part 32 sends an update complete notification to the eating and drinking establishment information providing server 2, and this notification is retrieved by the incentive exchange process part 22. Having received this update complete notification from the application server 3, the incentive exchange process part 22 updates the user's medal number in the incentive information storage part 21. Specifically, the medal number "5" is used for this exchange, and this medal number is therefore subtracted and updated as "0." The incentive information storage part 21 in this state is shown in FIG. 13.

The medals accumulated by the user can be exchanged for items by executing such a process.

Figure 14:
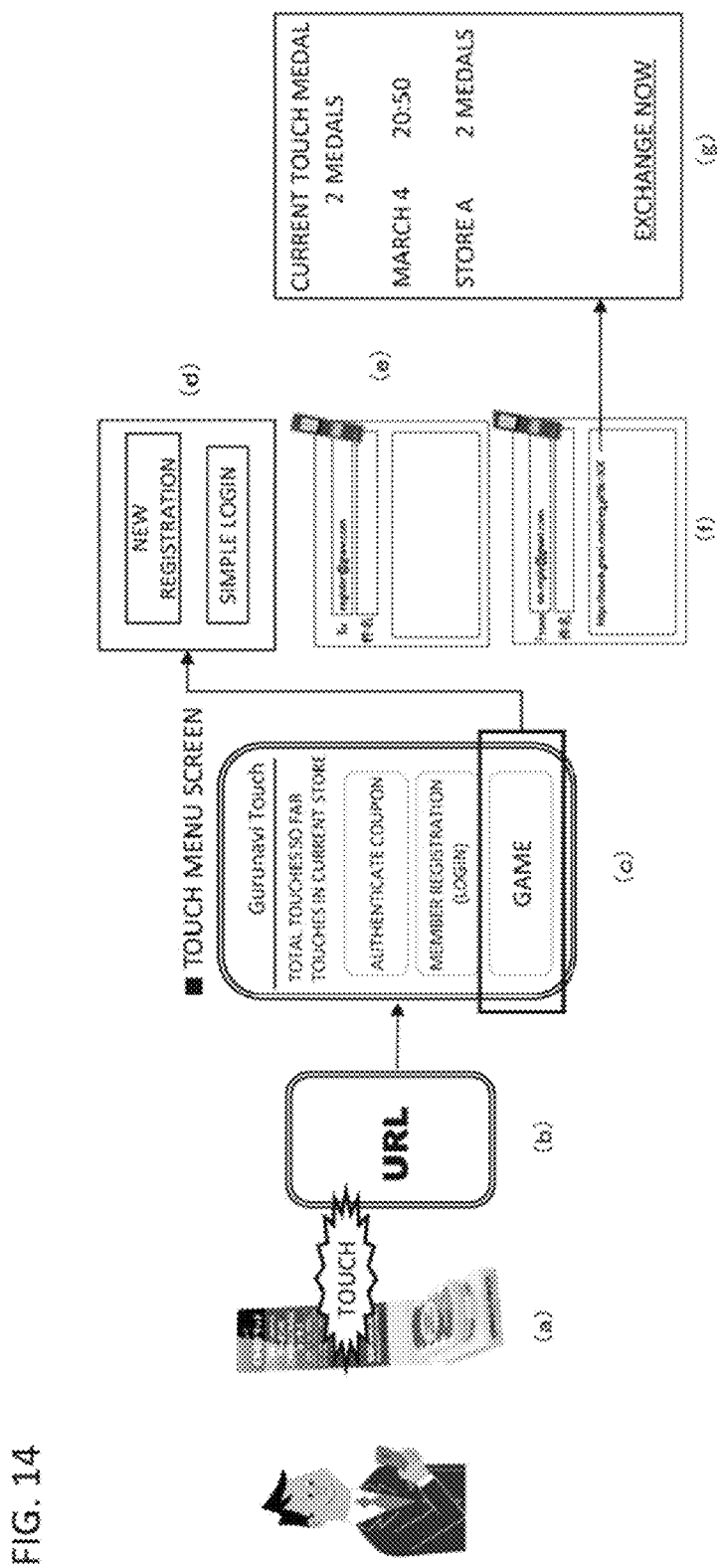
FIG. 14 is a diagram schematically depicting another example of the process of adding an incentive.

The process between the user terminal 5 and the reader 4 can be executed as follows. This process is schematically depicted in FIG. 14. In this case, the user's electronic mail address is stored in the incentive information storage part 21 in correlation with the user identifying information.

First, the user brings the user terminal 5 in contact with or in close proximity to the reader 4 (FIG. 14(*a*)). In this case, depending on the type of user terminal 5 the terminal is brought in contact with or in close proximity to the reader after predetermined application software stored on the user terminal 5 is started up.

Due to the user terminal 5 being brought in contact with or in close proximity to the reader 4, a predetermined URL is sent from the reader 4 to the user terminal 5, and the URL is retrieved by the user terminal 5 (FIG. 14(*b*)). This URL, which is information for accumulating medals, includes a token as a parameter. This token is capable of identifying which reader 4 the user terminal is brought in contact with or in close proximity to. For example, identifying information of the reader 4, information produced based on this identifying information, or the like is used as the token.

Having retrieved the URL in this manner, the user terminal 5 selects a button, which is "game" in FIG. 14(*c*), to perform a process for accumulating medals from the predetermined screen of the predetermined application software. A selection is made to either create a new registration or login (FIG. 14(*d*)), and when a new registration is selected, electronic mail software for creating the new registration is started up. A blank mail is then created, which contains an electronic mail address for creating the new registration (FIG. 14(*e*)). A user registration is thereby created from the electronic mail address if the user sends the blank mail.

In FIG. 14(*d*), when "simple login" is selected, it is to accumulate medals, and the electronic mail software is therefore started up. An electronic mail is then created, which includes the electronic mail address for accumulating medals and the retrieved URL described above (FIG. 14(*f*)). If the user sends an electronic mail, the visit information retrieving part 20 thereby specifies the user on the basis of the electronic mail address, and updates the medal in the incentive information storage part 21 on the basis of the URL token in the electronic mail (FIG. 14(*g*)).

Through this process, the user can accumulate medals when visiting eating and drinking establishments.

Furthermore, searching for eating and drinking establishments where medals can be accumulated may be enabled as an additional function of the present invention. In this case, the eating and drinking establishment information providing server 2 comprises an eating and drinking establishment information storage part (not shown) containing the eating and drinking establishment name, eating and drinking establishment identifying information, reader identifying information, position information of the eating and drinking establishment (preferably latitude-longitude information), and information indicating if medals can be accumulated (and if so, the medal number that can be accumulated). In this case, positional information (latitude-longitude information) of the user terminal 5 is retrieved by a GPS or the like, for example, due to a predetermined operation being performed in the user terminal 5. The position information and a search request are sent to the eating and drinking establishment information providing server 2, the search request is received in the eating and drinking establishment information providing server 2, and the eating and drinking establishment information storage part is thereby searched based on the position information. Eating and drinking establishments that are positioned within a predetermined range where medals can be accumulated are extracted from this position information. The extracted eating and drinking establishments and the medal numbers that can be accumulated are then sent to the user terminal 5, and can thereby be displayed on the user terminal 5. An example of these search results is shown in FIG. 15.

As another embodiment of the sales promotion assisting system 1 described above, the incentive information storage part 21 may be configured to accumulate medals for each eating and drinking establishment (as in FIG. 5), and a quick display of the medals accumulated at each eating and drinking establishment may be enabled. In this case, predetermined application software is started up in the user terminal 5, the eating and drinking establishment information providing server 2 is accessed from the user terminal 5, and information on the user's medal number stored in the incentive information storage part 21 on the basis of the user identifying information is extracted for each eating and drinking establishment. Based on the medal number information, the corresponding medal is displayed on the user terminal 5. In this case, different images of the medals may be displayed for each eating and drinking establishment, or the same image may be displayed. When a different medal image is displayed for each eating and drinking establishment, the medals can be more easily collected. When a different medal image is displayed for each eating and drinking establishment, the medal image information may be stored in advance in a predetermined storage area (e.g., the incentive information storage part 21 or the like) of the eating and drinking establishment information providing server 2 and from there retrieved, or the medal image information may be stored in advance in correlation with part of the predetermined application software of the user terminal 5. The medal number information itself may also be stored in the user terminal 5, and accessing the server may be done away with.

FIG. 16 shows an example of a brief screen of a medal image displayed in the user terminal 5. In FIG. 16, the position where the medal image is displayed is set for each eating and drinking establishment, and each medal image is displayed in the corresponding location of the eating and drinking establishment where the medal was accumulated. This manner of display makes it easier to collect medals. FIG. 17 shows an example in which the displayed medal images change according to the accumulated number of medals. FIG. 17 shows cases in a rice bowl shop in which the medal number changes from 1 to 10, from 11 to 30, and from 31 to above. This manner of configuration can entice the user to come to the eating and drinking establishment.

Figure 18:
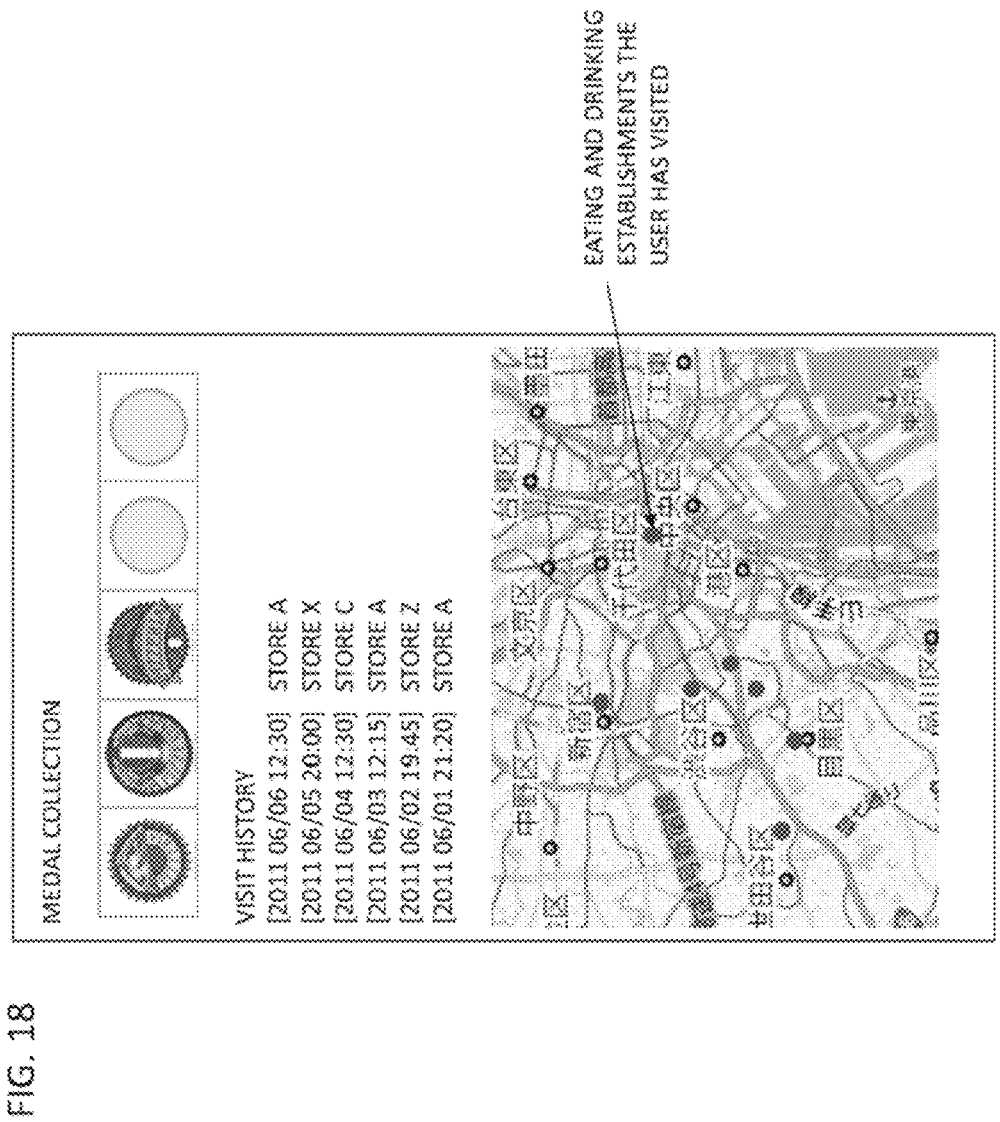
FIG. 18 shows an example of a screen displaying a user's visit information.

Because the user's visit information is stored in the incentive information storage part 21, eating and drinking establishments the user has visited may be displayed on a map based on this stored information. In this case, the position of the eating and drinking establishment is specified based on the reader identifying information in the visit information in the incentive information storage part 21, and the reader identifying information stored in the eating and drinking establishment information storage part, and a display is preferably created based on the specified position. An example of such an image is shown in FIG. 18. In FIG. 18, the positions of eating and drinking establishments the user has visited are displayed as points on a map, but these locations could also be displayed as images of the medals of the eating and drinking establishments, for example.

When the URL of an eating and drinking establishment's website is correlated with the points, images, and letters indicating an eating and drinking establishment displayed on the map, it is possible to have a configuration in which the user can display the eating and drinking establishment's website by selecting the points, images, and letters.

Figure 19:
FIG. 19 is a diagram showing an example of a screen of store information.

Based on the visit information in the incentive information storage part 21, the user that has visited the store the most number of times may be specified with each eating and drinking establishment, and the user identifying information of this user may be stored in correlation with the eating and drinking establishment in the eating and drinking establishment information storage part. This user may then be displayed with the information of the eating and drinking establishment. An example of this is schematically depicted in FIG. 19.

As described above, various application software programs can be made to function by using the sales promotion assisting system 1, an example of the present invention, and using this system can entice users to come to the eating and drinking establishment. The configurations of the above-described functions and the like constitute merely one example, and their distribution, and the functions can be arranged in a dispersed manner, for example, as appropriate. The processes can also be replaced as appropriate.

INDUSTRIAL APPLICABILITY

According to an example of the present invention, a specific incentive can be retrieved by passing a portable terminal or the like over a predetermined reading terminal installed in a store such as an eating and drinking establishment, based on which the incentive can be exchanged for an item or the like of application software such as a game. As a result, the incentive can be exchanged for an item or the like other than a coupon, which has less of an effect on the sales of the store. The incentive can also be exchanged for an item other than those of the store, which has more usable value for the user.

The following is a list of reference numerals and associated parts as used in this specification and drawings:
1: Sales promotion assisting system
2: Eating and drinking establishment information providing server
3: Application server
4: Reader
5: User terminal
20: Visit information retrieving part
21: Incentive information storage part
22: Incentive exchange process part
23: Incentive exchange information storage part
30: Incentive exchange information retrieving part
31: Item information storage part
32: Item exchange process part
70: Computation device
71: Storage device
72: Display device
73: Input device
74: Communication device The scope of the claims should not be limited by the preferred embodiments and examples, but should be given the broadest interpretation consistent with the specification as a whole.

What is claimed is:

1. A network system for assisting sales promotions in at least one eating and drinking establishment, the network system comprising:
a reader having a communication interface and memory installed in an eating and drinking establishment, the reader storing reader identifying information, and transmitting reader identifying information, visit information, and user identifying information;
a first server having a first processor and a first memory operatively coupled to the first processor; and
a second server having a second processor and a second memory operatively coupled to the second processor;
the first processor being programmed to:
store visit information and incentive information in the first memory;
in response to a user terminal being brought in contact with or in close proximity to the reader, retrieve visit information including at least user identifying information and reader identifying information from the user terminal or the reader, and store the visit information in the first memory; and
update the incentive information in the first memory when: (i) information for exchanging an incentive for an item is received from the user terminal and sent to the second server, and (ii) a notification of exchange process completion is received from the second server; and the second processor being programmed to:
retrieve item information from the first server;
store the item information in the second memory for an application service corresponding to individual users, the item information including user identifying information and password information of the user;
perform an authentication process of verifying whether the user identifying information and password information of the user is permitted; and
if permitted by the authentication process and in response to the retrieved item information, send a notification of the exchange process to the first server after the item exchange process has ended, such that the item information is updated in the first memory, and a number of the item is added in proportion to a number of exchange process completions,
wherein if the user terminal is not capable of transmitting or receiving information from the reader, the reader plays a predetermined sound unique to each reader or to each eating and drinking establishment that is detected by the user terminal such that the user terminal identifies the reader or the eating and drinking establishment based on the predetermined sound, and upon recognizing the predetermined sound played by the reader, the user terminal transmits reader identifying information, user identifying information and time information to the first server.

2. The network system according to claim 1, wherein, based on the visit information, the first processor updates the incentive information with the incentive, and the incentive corresponds to the eating and drinking establishment where the reader is installed.

3. The network system according to claim 1, wherein, based on the visit information, the first processor updates the incentive information in accordance with a number of times the user has visited the eating and drinking establishment where the reader is installed.

4. A network system for assisting sales promotions in at least one eating and drinking establishment, the network system comprising:
a reader installed in an eating and drinking establishment, the reader having a communication interface capable of transmitting information to and receiving information from a user terminal;
at least one server having a processor and a memory, the at least one server being programmed to:
store visit information and incentive information in the memory;
in response to the user terminal being brought in contact with or in close proximity to the reader, retrieve visit information including at least user identifying information and reader identifying information from the user terminal or the reader, and store the visit information in the memory;
receive from the user terminal information for exchanging an incentive for an item;
perform an authentication process of verifying whether the user identifying information and password information of the user is permitted; and
if permitted by the authentication process, execute a process of exchanging the incentive and the item by sending the information to a second server programmed to execute an application service that uses the item; and
update the incentive information in the memory upon receiving a notification of exchange process completion from the second server, a number of the item being added in proportion to a number of exchange process completions,
wherein if the user terminal is not capable of transmitting or receiving information from the reader, the reader plays a predetermined sound unique to each reader or to each eating and drinking establishment that is detected by the user terminal such that the user terminal identifies the reader or the eating and drinking establishment based on the predetermined sound, and upon recognizing the predetermined sound played by the reader, the user terminal transmits reader identifying information, user identifying information and time information to the at least one server.

5. A network system for assisting sales promotions in at least one eating and drinking establishment, the network system comprising:
a reader having a communication interface configured to transmit and receive information from a user terminal, the reader being installed in an eating and drinking establishment, the reader storing reader identifying information, and transmitting reader identifying information, visit information, and user identifying information;
a server, having a memory and a processor that executes a process pertaining to an incentive, the processor of the server being programmed to:
store information of the incentive for individual eating and drinking establishments and visit information;
retrieve, based on the user terminal used by a user being brought in contact with or in close proximity to the reader, visit information including at least user identifying information and reader identifying information from the user terminal or the reader, and store the visit information in the memory;
extract the incentive information stored in the memory and display image information of items for each of the eating and drinking establishments on the user terminal in accordance with a request from application software in the user terminal; and
display at least one eating and drinking establishment visited by the user on the user terminal based on the visit information stored, in accordance with a request from application software in the user terminal,
wherein the image information of the items for each eating and drinking establishment displayed on the user terminal is varied and added according to the stored incentive information of each eating and drinking establishment such that items obtained by the user are displayed, and
if the user terminal is not capable of transmitting or receiving information from the reader, the reader plays a predetermined sound unique to each reader or to each eating and drinking establishment that is detected by the user terminal such that the user terminal identifies the reader or the eating and drinking establishment based on the predetermined sound, and upon recognizing the predetermined sound played by the reader, the user terminal transmits reader identifying information, user identifying information and time information to the server.

* * * * *